United States Patent [19]
Koch et al.

[11] Patent Number: 5,827,602
[45] Date of Patent: Oct. 27, 1998

[54] HYDROPHOBIC IONIC LIQUIDS

[75] Inventors: Victor R. Koch, Lincoln; Chenniah Nanjundiah, Lynn, both of Mass.; Richard T. Carlin, Nashua, N.H.

[73] Assignee: Covalent Associates Incorporated, Woburn, Mass.

[21] Appl. No.: 932,931

[22] Filed: Sep. 17, 1997

Related U.S. Application Data

[63] Continuation of Ser. No. 673,422, Jun. 28, 1996, abandoned, which is a continuation-in-part of Ser. No. 497,310, Jun. 30, 1995, abandoned.

[51] Int. Cl.$^6$ .............................. H01M 6/14; C25B 9/00; H01G 1/74; H01G 9/00
[52] U.S. Cl. .......................... 429/194; 429/198; 429/46; 204/242; 252/622; 361/503; 361/504
[58] Field of Search .................................... 429/194, 198, 429/346; 204/242; 252/622; 361/503, 504

[56] References Cited

U.S. PATENT DOCUMENTS

| | | | |
|---|---|---|---|
| H1462 | 7/1995 | Walker | 429/191 |
| 2,446,331 | 8/1948 | Hurley et al. | 204/14 |
| 2,446,349 | 8/1948 | Wier et al. | 204/14 |
| 2,446,350 | 8/1948 | Wier et al. | 204/14 |
| 3,654,330 | 4/1972 | Wiesboeck | 260/440 |
| 4,329,404 | 5/1982 | Bowden et al. | 429/50 |
| 4,463,071 | 7/1984 | Gifford et al. | 429/194 |
| 4,505,997 | 3/1985 | Armand et al. | 429/192 |
| 4,707,432 | 11/1987 | Kalnin et al. | 429/112 |
| 4,758,483 | 7/1988 | Armand et al. | 429/192 |
| 4,818,644 | 4/1989 | Armand | 429/192 |
| 4,833,048 | 5/1989 | Dejonghe et al. | 429/104 |
| 4,851,307 | 7/1989 | Armand et al. | 429/192 |
| 4,882,244 | 11/1989 | Donahue et al. | 429/194 |
| 4,923,950 | 5/1990 | Ravaine et al. | 528/38 |
| 5,021,308 | 6/1991 | Armand et al. | 429/194 |
| 5,220,106 | 6/1993 | Boate et al. | 585/865 |
| 5,273,840 | 12/1993 | Dominey | 252/62.2 |
| 5,514,493 | 5/1996 | Waddell et al. | 429/198 |
| 5,683,832 | 11/1997 | Bonhote et al. | 429/111 |

FOREIGN PATENT DOCUMENTS

| | | |
|---|---|---|
| 5-74656 | 3/1993 | Japan. |
| 6-61095 | 3/1994 | Japan. |

OTHER PUBLICATIONS

Kita et al., "Organic–electrolyte battery having high stability under high voltage," Chem. Abstracts: Batteries & Fuel Cells, issue 12, pp. 3–4, Abstract No.:270043q (1995) month unavailable.

Kunishi et al., "Double–layer capacitors," Chem. Abstracts: Electric Phenomena 120:959 Abstract No.: 21602J (1994) month unavailable. JP 05–74,656.

Higuchi et al., "Double–layer electric capacitors," Chem. Abstracts: Electric Phenomena 121:831 Abstract No.: 168547Z (1994) month unavailable. JP 06–61,095.

Wikes et al., "Air and Water Stable 1–Ethyl–3–methylimidazolium Based Ionic Liquids," J. Chem. Soc., Chem. Commun., pp. 965–967 (1992) month unavailable.

Gifford et al., "A Substituted Imidazolium Chloroaluminate Molten Salt Possessing an Increased Electrochemical Window," J. Electrochem. Soc. 134:610–614 (1987) month unavailable.

Osteryoung, "Organic Chloroaluminate Ambient Temperature Molten Salts," *Molten Salt Chemistry*, Mamanatov and Marassi (eds.), D. Reidel Publishing Co., pp. 329–364 (1987) month unavailable.

Wikes, "Nuclear Magnetic Resonance in Molten Salts," *Molten Salt Chemistry*, Mamanatov and Marassi (eds.), D. Reidel Publishing Co., pp. 217–236 (1987) month unavailable.

*Primary Examiner*—Kathryn L. Gorgos
*Assistant Examiner*—Edna Wong
*Attorney, Agent, or Firm*—Weingarten, Schurgin, Gagnebin & Hayes LLP

[57] ABSTRACT

Ionic liquids having improved properties for application in non-aqueous batteries, electrochemical capacitors, electroplating, catalysis and chemical separations are disclosed. Exemplary compounds have one of the following formulas:

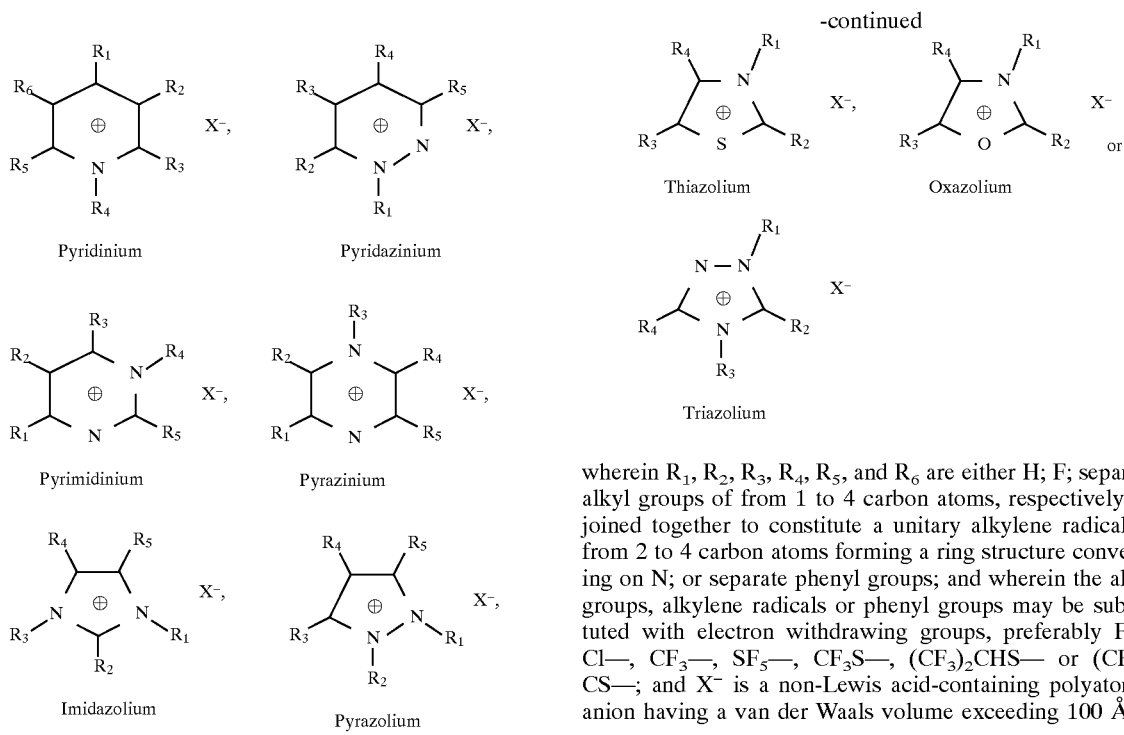

wherein $R_1$, $R_2$, $R_3$, $R_4$, $R_5$, and $R_6$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, alkylene radicals or phenyl groups may be substituted with electron withdrawing groups, preferably F—, Cl—, $CF_3$—, $SF_5$—, $CF_3S$—, $(CF_3)_2CHS$— or $(CF_3)_3CS$—; and $X^-$ is a non-Lewis acid-containing polyatomic anion having a van der Waals volume exceeding 100 Å$^3$.

25 Claims, 2 Drawing Sheets

HYDROPHOBIC IONIC LIQUIDS

RELATED APPLICATION

This application is a continuation of application Ser. No. 08/673,422, filed Jun. 28, 1996, now abandoned, which was a continuation-in-part of application Ser. No. 08/497,310, filed Jun. 30, 1995 now abandoned.

GOVERNMENT RIGHTS

Part of the work leading to this invention was carried out with United States government support provided under Department of Defense contracts F33615-94-C-2469 and Department of Energy contract F602-96ER82149. Therefore the U.S. government has certain rights in this invention.

FIELD OF THE INVENTION

This invention relates to solvent-free ionic liquids, useful as non-aqueous electrolytes, particularly in non-aqueous batteries, electrochemical capacitors, electroplating, catalysis and chemical separations.

BACKGROUND OF THE INVENTION

Solvent-free ionic liquids or "room temperature molten salts" were first disclosed by Hurley and Wier in a series of U.S. Patents (U.S. Pat. Nos. 2,446,331; 2,446,339; 2,446,350). These room temperature melts, comprised of $AlCl_3$ and a variety of n-alkylpyridinium halides, afforded a conducting bath for aluminum electroplating. However, a disadvantage of these first molten salts, and a serious problem with any solvent-free ionic liquid containing a strong Lewis acid such as $AlCl_3$, is the liberation of toxic gas when exposed to moisture. Additionally, the highly reactive nature of Lewis acids used to form room temperature melts limits the kinds of organic and inorganic compounds which are stable in these media.

Over the past 15 years, work in room temperature melts has been dominated by the use of varying proportions of $AlCl_3$ and 1-ethyl-3-methylimidazolium (EMI) chloride as discussed in separate review articles by Wilkes and Osteryoung (Osteryoung, Robert A., (p. 329) and Wilkes, John S., (p. 217) in *Molten Salt Chemistry*, G. Mamantov and R. Marassi, eds., D. Reidel Publishing, Dordrecht, Holland, 1987) and in Japanese patent Nos. 0574656 (Endo, 1993) and 0661095 (Kakazu, 1994). However, these solvent-free ionic media suffer from the same problems encountered in the melts disclosed by Hurley and Wier.

In 1992, Wilkes and Zaworotko disclosed two new room temperature solvent-free ionic liquids, EMI $BF_4$ and EMI $O_2CCH_3$ (J. Chem. Soc., Chem. Commun., 965, 1992). Although neither liquid contains a Lewis acid, and therefore, does not liberate toxic gas when exposed to moisture, both are hygroscopic. Additionally, as electrolytes in electrochemical cells, the $BF_4^-$ and $CH_3C_2^-$ anions oxidize at potentials lower than those desirable for electrochemical generators.

Therefore, a need exists to improve solvent-free ionic liquids such that they exhibit wide electrochemical windows and are not hygroscopic. Such improved solvent-free ionic liquids are the subject of the present invention.

SUMMARY OF THE INVENTION

According to the present invention, hydrophobic ionic liquids are provided having improved properties for application in non-aqueous batteries, electrochemical capacitors, electroplating, catalysis and chemical separations. When fluorinated, the hydrophobic ionic liquids of the invention are also particularly useful as superior hydraulic fluids and inert liquid diluents for highly reactive chemicals.

The ionic liquids of the invention have a wide liquidus range and offer the advantages of high thermochemical and electrochemical stability. In addition, the ionic liquids of the invention are hydrophobic in nature, being poorly soluble in water. This finding is of great technological importance since the presence of water in, e.g., electrochemical generators can severely shorten the lifetime of the device. Similarly, the presence of water in certain electroplating baths results in a poor metal deposition. In addition, as taught by U.S. Pat. No. 5,220,106, the use of water with a solvent-free ionic liquid (e.g., for petroleum separations) is highly desirable, but the presence of water diminishes extraction capacity because the ionic liquid dissolves into the water cosolvent.

The hydrophobic, ionic liquids of the invention have one of the following formulas:

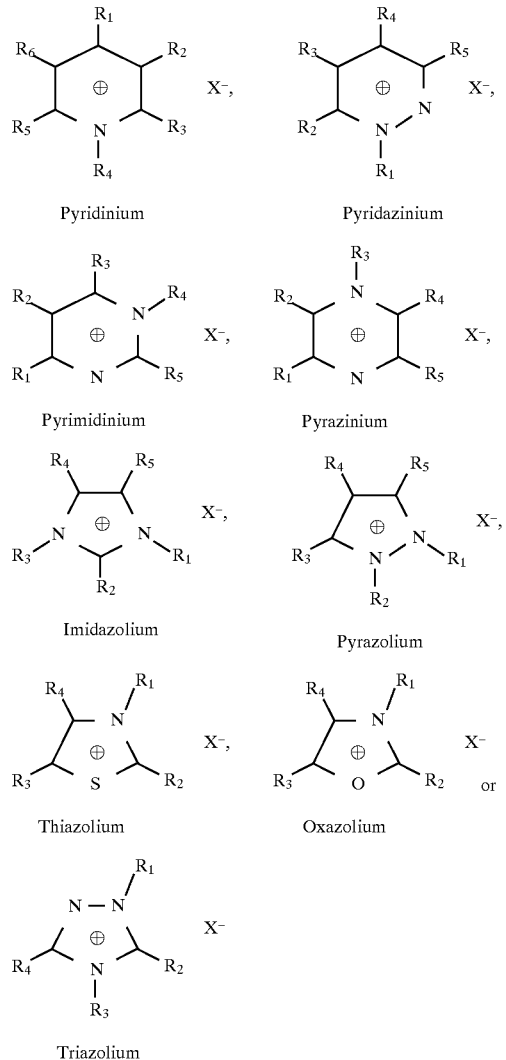

wherein $R_1$, $R_2$, $R_3$, $R_4$, $R_5$, and $R_6$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, alkylene radicals or phenyl groups may be substituted with electron withdrawing groups, preferably F—, Cl—, $CF_3$—, $SF_5$—, $CF_3S$—, $(CF_3)_2CH S$— or $(CF_3)_3 CS$—; and $X^-$ is a non-Lewis acid containing polyatomic anion having a van der Waals volume exceeding 100 Å$^3$. Preferably, the van der Waals volume of the polyatomic anion $X^-$ exceeds 140 Å$^3$.

An exemplary anion in the hydrophobic ionic liquids of the invention is of the following form:

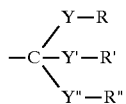

wherein each of the moieties Y, Y', and Y'', are —$SO_2$— or —CO—; the groups R and R' are separate halogenated alkyl groups of 1–4 carbon atoms, respectively or are joined together to constitute a unitary halogenated alkylene radical of from 2–4 carbon atoms linking Y and Y' and forming a ring structure which includes R, R', Y, Y', and the carbon atom to which Y and Y' are attached; and the group R'' is an alkyl or haloalkyl radical of 1–4 carbon atoms or a halogenated phenyl group.

In another exemplary anion, the —Y'—R' group in the formula above is replaced by Z, which is an electron-withdrawing substituent selected from the group consisting of —C(O)H, —$NO_2$, —CN, —F, and perfluorinated alkyls and aryls containing no more than 8 carbons.

A further exemplary anion has the formula:

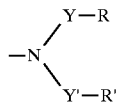

wherein each of the moieties Y and Y' are —$SO_2$— or —CO—; and the groups R and R' are separate halogenated alkyl groups of 1–4 carbon atoms.

In the exemplary anions described above, the moieties Y, Y', and Y'' are preferably —$SO_2$— moieties. The groups R, R', and R'' each preferably contains one or two carbon atoms, with one carbon atom being most preferred. These groups are preferably halogenated with fluorine or chlorine, the most preferred halogen being fluorine, and are preferably perhalogenated.

In other embodiments, the anion is a mono- or diperfluorosulfonate, or the anion is any one of $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$ or $(O(CF_3)_2C_2(CF_3)_2O)_2PO^-$.

Exemplary perfluorinated hydrophobic ionic liquids are: 1-ethyl-3-methylimidazolium perfluoro-1,1-dimethylpropyl alkoxide (EMI pfDMP, I) and perfluoro-1-ethyl-3-methylimidazolium imide (pfEMI Im, II).

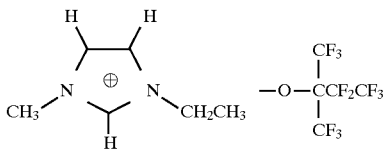

-continued

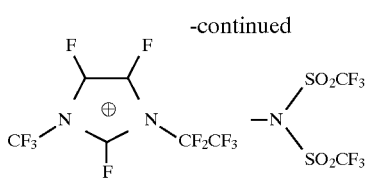

Not being bound by any theory, it is believed that one of the causes of the desirable hydrophobic property of the ionic liquids of the invention is the large size of the cations and anions involved. For example, the anions $(CF_3SO_2)_2N^-$, bis(trifluoromethylsulfonyl) imide or "Imide," and $(CF_3SO_2)_3C^-$, tris(trifluoromethylsulfonyl) methide or "Methide," have van der Waals volumes of 143 and 206 Å$^3$, respectively, while the anion perfluoro-1,1-dimethylpropyl alkoxide has a van der Waals volume of 144 Å$^3$. For comparison, other anions commonly paired with EMI cations in prior art ionic liquids are $AlCl_4^-$ (113 Å$^3$), $CF_3SO_3^-$ (80 Å$^3$), and $BF_4^-$ (48 Å$^3$), all of which are highly reactive with or highly soluble in water.

Exemplary imidazolium and pyridinium cations in the ionic liquids of the invention, 1-ethyl-3-methylimidazolium (EMI) and n-butylpyridinium (BP) have van der Waals volumes of 118 and 152 Å$^3$, respectively. Additionally, the delocalization of the cation positive charge over the ring atoms results in a relatively low crystal lattice energy and a less reactive species. In the prior art, the imide and methide anions are commonly paired with metal cations (e.g., $Li^+$, $Na^+$ or $K^+$) or the ammonium ion, which have van der Waals volumes in the range of about 2 to about 18 Å$^3$. Properties of the imidazolium and pyridinium cations along with those of the other nitrogen-based cations described herein are discussed in Wilkes et al., U.S. Air Force Report No. FJSRL-TR-82-0002, U.S. Air Force Academy, January, 1982.

Furthermore, the hydrophobic ionic liquids of the invention are defined as containing only non-Lewis acid anions. This requirement reduces the reactive nature of the ionic liquids of the invention and is believed to contribute to the desirable hydrophobic property of the disclosed compounds.

When the cation and/or the anion is fluorinated, the hydrophobic ionic liquids of the invention have certain additional special properties including resistance to extremes of temperature and pressure, resistance to corrosive acids and bases, and inertness to organic solvents and oxidizing agents. For example, pfEMI Im can be likened to "ionic liquid Teflon®," in analogy with the physical and chemical properties of Teflon®, a solid perfluorinated hydrocarbon, (see, e.g., R. D. Chambers in "Fluorine in Organic Chemistry," Wiley-Interscience, New York, 1973, and references therein). Perfluorinated hydrophobic ionic liquids of the invention have applications as superior hydraulic fluids, inert liquid diluents for highly reactive chemicals and solvents with a high capacity for dissolved gases such as oxygen, and are useful for catalysis and for oil and gas separations where the desired product is partitioned between an aqueous and hydrophobic perfluorinated ionic liquid phase.

A further advantage of the hydrophobic ionic liquids of the invention is their ability to dissolve quantities of LiX (where X=any anion of the invention). The presence of the lithium cation then allows these media to be used as electrolytes in either primary or secondary (rechargeable) lithium batteries. For example, the dissolution of 250 mM, LiIm in 1,2-dimethyl-3-propylimidazolium (DMPI) Im results in a stable electrochemical interface in a metallic Li electrode dipped into this medium.

Another advantage of these new media is the unprecedented high oxidation potential afforded by the electrochemical stability of the anions. Both the Imide and Methide anions were found to oxidize at potentials higher than other common anions used in electrochemical technologies. This feature makes these media highly desirable for use as electrolytes in electrochemical capacitors, and with the addition of, e.g., lithium Imide or lithium Methide, is an additional property making these media useful as electrolytes in rechargeable lithium-ion batteries.

Hydrophobic ionic liquids of the invention having both large cations and large anions have reduced ionic conductivity. However, the addition of a polar organic liquid as a cosolvent enhances the ionic conductivity by lowering the solution viscosity. An improved electrolyte of the invention, for use in an electrochemical cell, includes a hydrophobic ionic liquid as described above and a polar organic liquid, which, in one embodiment, is selected from the group consisting of linear ethers, cyclic ethers, esters, carbonates, lactones, nitriles, amides, sulfones and sulfolanes. In another embodiment, the polar organic liquid is selected from the group consisting of diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrrolidone, dimethylsulfone, tetramethylene sulfone, sulfolane and thiophene.

Furthermore, the hydrophobic ionic liquids of the invention afford high thermochemical stability. The Imide and Methide anions decompose at temperatures beyond 300° C. while imidazolium cations are stable to 270° C. Room temperature molten salts containing Lewis acids typically decompose below 150° C.

Large anions such as Imide are also known to influence the stereoselectivity of products derived from organic synthesis reactions. For example, Handy and coworkers (Synthetic Letters, 565, 1995) found that 4M solutions of lithium Imide in acetone or diethyl ether are practical media for promoting and accelerating [4+2] cycloaddition reactions. An unexpected finding of this work was that Imide gave predominantly exo-adducts while the smaller perchlorate anion gave the expected endo-adduct. This suggests that the hydrophobic ionic liquids of the invention, which comprise large anions, may, in concentrations of from 4–5M, be useful as synthetic media for reactions in which novel stereochemical outcomes are desirable.

BRIEF DESCRIPTION OF THE DRAWINGS

A more complete appreciation of the invention may be obtained from a consideration of the following detailed description taken in conjunction with the drawings in which.

DETAILED DESCRIPTION

Figure 1:
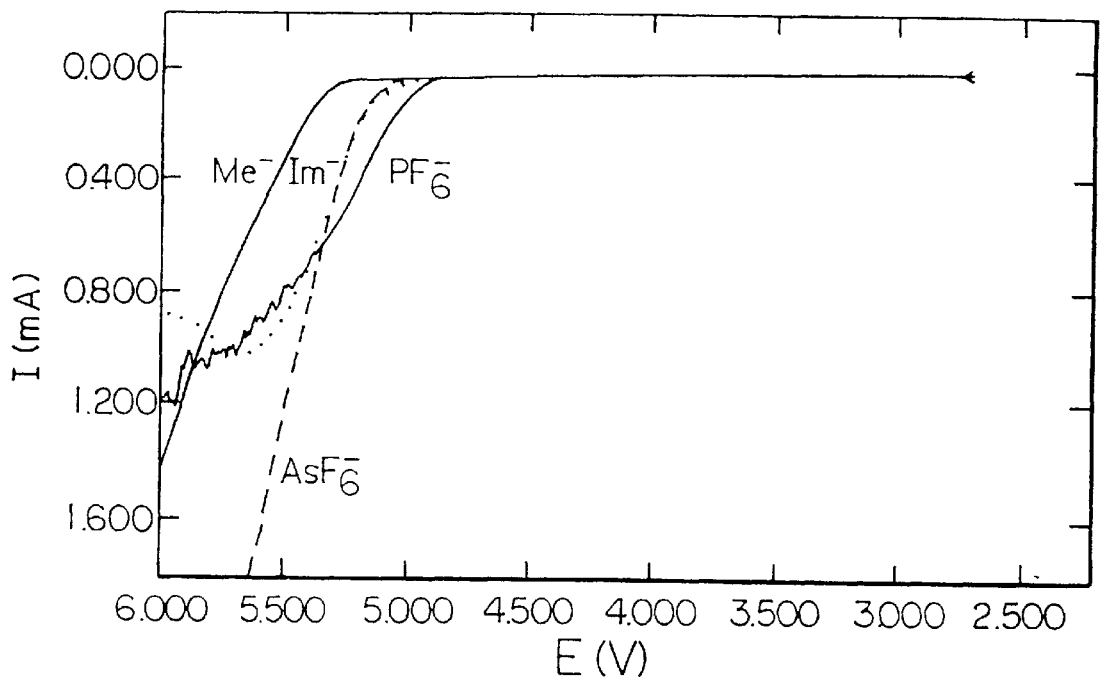
FIG. 1 shows a series of linear sweep voltammograms acquired at a platinum electrode in several solvent-free ionic liquids.

The following examples are presented to illustrate the advantages of the present invention and to assist one of ordinary skill in making and using the same. These examples are not intended in any way otherwise to limit the scope of the disclosure.

EXAMPLE I

Synthesis of 1,2-dimethyl-3-propylimidazolium Imide and Methide 1,2-Dimethyl-3-propylimidazolium Imide and Methide are prepared by a metathesis reaction in acetonitrile according to the following generic formula:

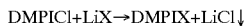

where X=Imide (Im$^-$) or Methide (Me$^-$).

The starting compound 1,2-dimethyl-3-propylimidizolium chloride (DMPICl) was prepared and purified according to the method of Gifford and Palmisano (J. Electrochem. Soc. 134:610, 1987). LiIm (3M Company, Minneapolis, Minn.) was used without further purification. LiMe (mp 272°–273° C.) was prepared in accordance with U.S. Pat. No. 5,273,840, hereby incorporated by reference, and was purified by dissolution in hot deionized HO followed by refluxing with activated charcoal. After filtration with Celite® filter aid, the H$_2$O was removed under vacuum, leaving pure LiMe.

All DMPIX reaction mixtures in acetonitrile were cold-vacuum filtered to remove LiCl. The acetonitrile was then removed under vacuum and the DMPIX residue taken up in CH$_2$Cl$_2$. This solution was extracted with deionized H$_2$O to remove residual LiCl. At this stage in the synthesis, a water soluble room temperature molten salt would not have remained in CH$_2$CH$_2$ when extracted with an aqueous layer. However, because DMPI Me is at least 1000 fold less soluble in water than the prior art compounds DMPI AsF$_6$ or DMPI PF$_6$, the extraction of residual precursor material was successful and the synthesis could proceed.

When the aqueous phase tested negative for Cl$^-$ via an aqueous AgNO$_3$ solution, the organic phase was dried over MgSO$_4$, filtered, and the CH$_2$Cl$_2$ removed under reduced pressure. The residual salt was dried under vacuum at 80° C. for 16 hours. If at this point the product was not a colorless oil, DMPIX was taken up in dry CH$_2$Cl$_2$ and refluxed with activated charcoal for 4 hours. After the addition of Celite® the mixture was vacuum filtered through a Whatman GF/F 0.7 $\mu$m filter disk and the solution was treated as before. All DMPIX yields exceeded 95%. Fourier transform infrared spectroscopy (FTIR) spectra of DMPIX were essentially identical to an overlay of the FTIR spectra of DMPICl and LiX.

EXAMPLE II

Synthesis of n-butylpyridinium Imide (BPIm) and Methide (BPMe)

Exemplary pyridinium ionic liquids, n-butylpyridinium Imide (BPIm) and Methide (BPMe), are also prepared by a metathesis reaction in acetonitrile, as described above, according to the formula:

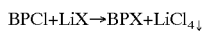

where X=Im$^-$ or Me$^-$.

The starting compound n-butylpyridinium chloride (BPCl) was synthesized and purified according to the methods of J. Robinson and R. A. Osteryoung, as described in J. Chem. Soc. 101:323 (1979).

EXAMPLE III

Synthesis of 1-ethyl-3-methylimidazolium Perfluoro-1,1-dimethylpropyl Alkoxide (EMI pfDMP)

1-Ethyl-3-methylimidazolium perfluoro-1,1-dimethylpropyl alkoxide (EMI pfDMP) was prepared by a metathesis reaction in acetonitrile, as described above, according to the formula:

EMI Cl+LiX→EMI X+LiCl↓ where X=pfDMP.

The starting compound EMI Cl was prepared in accordance with Wilkes et al., Inorg. Chem. 21:1263 (1982), and Li pfDMP was from the Department of Chemistry, Portland State University, Portland, Oreg. (P. Nelson, G. Gard, in house work). The EMI pfDMP product was found to be a colorless oil, insoluble in water, with an FTIR spectrum which is essentially equivalent to an overlay of the FTIR spectra of the two starting materials, EMI Cl and Li pfDMP.

EXAMPLE IV

Synthesis of Perfluoro-1-ethyl-3-methylimidazolium Imide (pfEMI Im)

Perfluoro-1-ethyl-3-methylimidazolium Imide (pfEMI Im) was synthesized, according to a newly developed procedure, from 1-ethyl-3-methylimidazolium Imide (EMI Im) and commercially available $K_2NiF_6$ in anhydrous HF (aHF) at −30° C. in accordance with the generic formula:

EMI Im+11 $K_2NiF_6$→pfEMI Im+22 KF+11 NiF2↓+11 HF

Since one equivalent of $K_2NiF_6$ replaces one H with F on the EMI cation, and since there are eleven replaceable hydrogen atoms on $EMI^+$, an amount of $K_2NiF_6$ equal to eleven times the amount of EMI, in equivalents, was used in this example in order to perfluorinate the cation. Should a lesser degree of fluorination be desirable, a correspondingly smaller amount of $K_2NiF_6$ may be used.

The starting compound EMI Im was synthesized in accordance with the method of Koch and coworkers (J. Electrochem. Soc., 142:L116, 1995). $K_2NiF_6$ (Ozark-Mahoning Atochem, Tulsa, Okla.) was used without further purification. The two reagents were placed in separate Teflon® tubes sealed at the bottom and inserted into a 3-way Teflon® PFA ¼" tubing union T. The third port of the union T was then connected to a vacuum line. aHF was condensed onto each reagent under reduced pressure at −30° C. EMI Im formed a clear, colorless solution with the aHF while $K_2NiF_6$ formed a deep purple solution with the aHF. When a small amount (~10 v/o) of the $K_2NiF_6$ solution was transferred by tipping onto the EMI Im/aHF solution, an instantaneous reaction took place such that the purple color was immediately discharged and replaced with a yellow precipitate ($NiF_2$). Additional small increments of $K_2NiF_6$/aHF were added to the EMI Im/aHF solution until the reaction had gone to completion as evidenced by the complete absence of purple color.

The aHF was removed under vacuum after which the union T was disconnected from the vacuum line and the contents added to water into which the $NiF_2$ dissolved. The aqueous solution was extracted with ether, and when the ether was removed under vacuum, a clear colorless oil remained. The FTIR spectrum of this material was consistent with that of pfEMI Im, i.e., no C—H stretching or bending modes were observed in the spectrum while the bands associated with the $Im^-$ anion were intact. These data indicate that all of the C—H bonds in $EMI^+$ were replaced by C—F bonds. Because the pfEMI Im was insoluble in water, it was deemed to be a hydrophobic ionic liquid.

The new perfluorinated nitrogen based cation $pfEMI^+$ may also be paired with other anions having van der Waals volumes less than 100 $Å^3$ to produce an ionic liquid, or perhaps a solid at room temperature, having hydrophobic properties. As the synthetic fluorination technique disclosed herein is a general technique, all of the nitrogen-containing ring systems described in this application may be similarly perfluorinated.

EXAMPLE V

Resistance to Electrochemical Oxidation

Four compounds investigated by linear sweep voltammetry had a common cation, 1,2-dimethyl-3-propylimidazolium (DMPI), shown below.

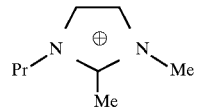

DMPI Im and DMPI Me are ionic liquids of the invention while DMPI $PF_6$ and DMPI $AsF_6$ are prior art compounds. Because DMPI $PF_6$ and DMPI $AsF_6$ were solids at room temperature, this experiment was conducted at 80° C. to assure that all of the salts were fluid.

FIG. 1 shows a series of linear sweep voltammograms acquired at a platinum electrode for each of the ionic liquids investigated. These overlays reveal that the order of oxidation is DMPI $PF_6$, DMPI $AsF_6$, DMPI Im and DMPI Me. When the platinum electrode was scanned from the rest potential at 2.7V (vs. a Li reference) to more positive voltages, it was observed that DMPI $PF_6$ began to oxidize with the evolution of gas at 5.00V. Next, DMPI $AsF_6$ oxidized at 5.10V, followed by DMPI Im at 5.13V and DMPI Me at 5.35V. As assurance that this reactivity order was not an artifact of the platinum electrode, the same experiment was carried out on glassy carbon, and tungsten. All of the data are collected in Table 1 and show that, indeed, DMPI Im and DMPI Me, exemplary hydrophobic ionic liquids of the invention, are anodically robust. This feature is of critical importance in designing electrochemical generators that operate at high anodic potentials.

TABLE 1

| Oxidation potentials of DMPIX salts at 1 mA/cm². $E_a$ WORKING ELECTRODE ± 20 mV[a] | | | |
|---|---|---|---|
| X | Glassy Carbon | W | Pt |
| $PF_6^-$ | 4.94 | 4.72 | 5.00 |
| $AsF_6^-$ | 5.05 | 4.75 | 5.10 |
| $Im^-$ | 5.06 | 5.16 | 5.13 |
| $Me^-$ | 5.34 | 5.34 | 5.35 |

[a]vs. $Li^+$/Li at 80° C.

Figure 2:
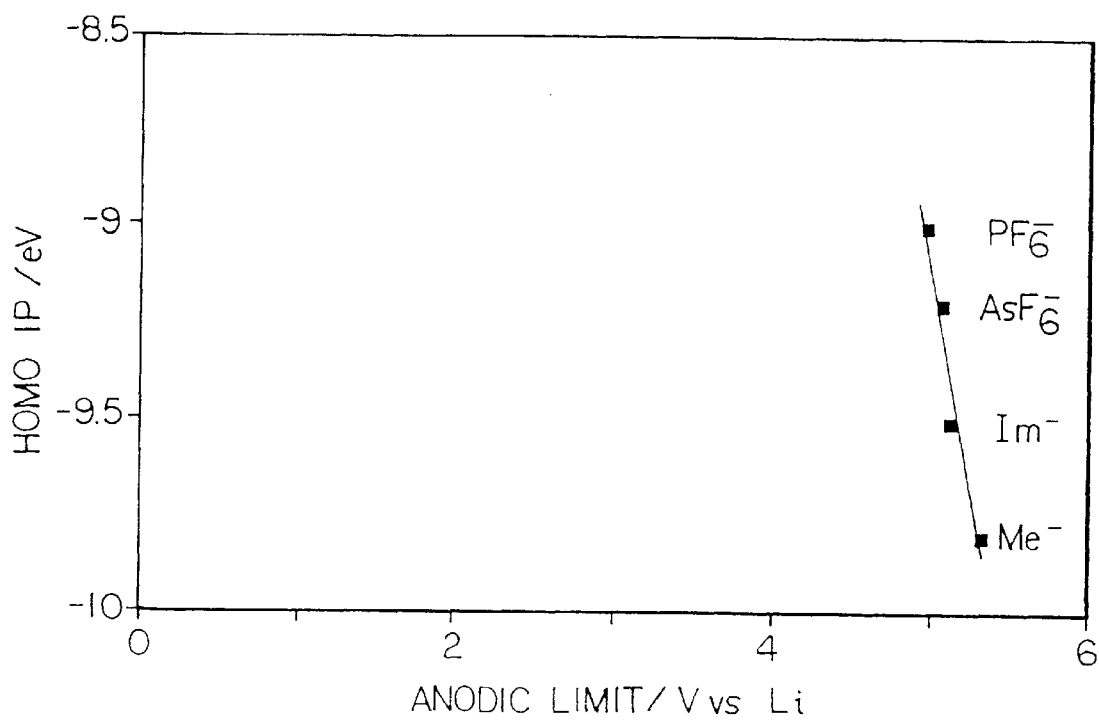
FIG. 2 shows a plot of calculated anion ionization potentials vs. experimentally measured electrochemical oxidation potentials.

Theoretical oxidation potentials were then calculated by an ab initio technique and plotted against the experimental data from the platinum electrode. FIG. 2 shows a plot of calculated highest occupied molecular orbital (HOMO) anion ionization potential energies vs. experimental oxidation potentials determined at Pt for DMPIX, where X=$AsF_6^-$, $PF_6^-$, Im$^-$, or Me$^-$. A correlation coefficient of 0.91 was obtained, showing a good correlation of the theoretical and experimentally observed values. The calculated oxidation potentials or highest occupied molecular orbital (HOMO) ionization potentials for Imide and Methide are the largest values reported to date, indicating that these two anions are highly robust.

The room temperature oxidation potentials were also determined for DMPI Im and DMPI Me at a platinum electrode and were found to be 5.40 and 5.65V, respectively. These experimental values are among the highest reported to date for organic anions.

EXAMPLE VI

Ionic Conductivity

While the Im$^-$ and Me$^-$ anions manifest an extremely high resistance to electrochemical oxidation, their large size reduces the ionic conductivity of ionic liquids incorporating them. Table 2 compares the room temperature conductivities of eight different solvent-free ionic liquids as a function of three different cations and three different anions. As the volume of either the cation and/or anion increases, the specific conductance decreases. For example, the addition of one more alkyl group to EMI, forming DMPI, reduces the conductivity by a factor of 3 when the anion is held constant.

TABLE 2

Specific conductivities of various molten salts at 22° C.

| Molten Salt | σ, mScm$^{-1}$ | V$^a$, Å$^3$ | V$^b$, Å$^3$ |
|---|---|---|---|
| EMI AlCl$_4$ | 15.0 | 118 | 113 |
| EMI Im | 8.3 | 118 | 144 |
| EMI Me | 1.3 | 118 | 206 |
| DMPI AlCl$_4$ | 7.1 | 152 | 114 |
| DMPI Im | 2.5 | 152 | 144 |
| DMPI Me | 0.5 | 152 | 206 |
| BP$^c$ AlCl$_4$ | 10.3$^d$ | 152 | 113 |
| BP Im | 3.1 | 152 | 143 |

$^a$van der Waals volume of the cations
$^b$van der Waals volume of the anions
$^c$n-butylpyridinium
$^d$at 40° C.

The combination of a large DMPI$^+$ cation and either the Im$^-$ or Me$^-$ anion greatly reduces the ionic conductivity. However, the addition of a polar organic liquid as a cosolvent to DMPIX enhances the ionic conductivity by lowering the solution viscosity. For example, 2M DMPIMe in 1:1 (v/v) of propylene carbonate (PC) and dimethyl carbonate (DMC) has a specific conductivity of 13 Mscm$^{-1}$, which is 26 times the conductivity of the neat melt. PC/DMC is a common cosolvent mixture used in Li batteries and electrochemical capacitors.

Table 3 collect the van der Waals volume data for a series of polyatomic anions used in electrochemical applications.

TABLE 3 van der Waals volumes of various anions.

| Anion | V$^a$, Å$^3$ | V$^b$, Å$^3$ |
|---|---|---|
| BF$_4^-$ | 48 | 49 |
| ClO$_4^-$ | 52 | 55 |
| PF$_6^-$ | 68 | 69 |
| AsF$_6^-$ | 73 | 73 |
| CF$_3$SO$_3^-$ | 80 | 80 |

TABLE 3-continued van der Waals volumes of various anions.

| Anion | V$^a$, Å$^3$ | V$^b$, Å$^3$ |
|---|---|---|
| (CF$_3$)$_2$PF$_4^-$ | 105 | — |
| AlCl$_4^-$ | 113 | — |
| (CF$_2$SO$_3^-$)$_2$ | 124 | — |
| SF$_5$CF$_2$SO$_3^-$ | 124 | — |
| (CF$_3$SO$_2$)$_2$N$^-$ | 143 | 146 |
| CF$_3$CF$_2$(CF$_3$)$_2$CO$^-$ | 144 | — |
| CF$_3$(CF$_2$)$_3$SO$_3^-$ | 149 | — |
| (CF$_3$SO$_2$)$_2$CH$^-$ | 149 | — |
| (CF$_2$CF$_2$SO$_3^-$)$_2$ | 170 | — |
| (SF$_5$)$_3$C$^-$ | 199 | — |
| (CF$_3$SO$_2$)$_3$C$^-$ | 206 | — |
| [O(CF$_3$)$_2$C$_2$(CF$_3$)$_2$O]$_2$PO$^-$ | 352 | — |
| CF$_3$(CF$_2$)$_7$SO$_3^-$ | 249 | — |

$^a$calculated via Hyperchem ® software
$^b$crystallographic data for comparison to the calculated values

EXAMPLE VII

Figure 3:
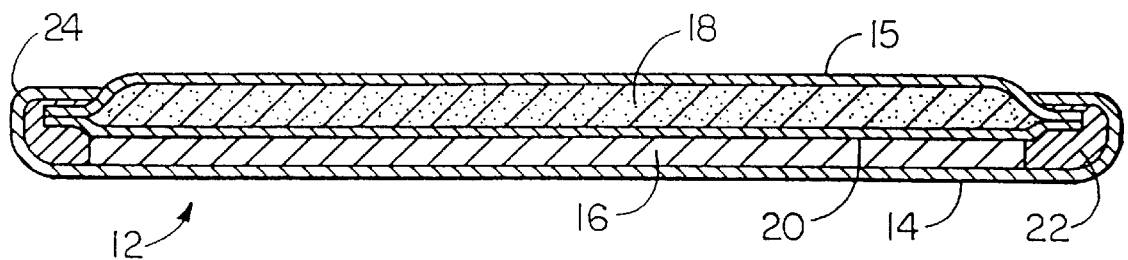
FIG. 3 shows an arrangement of components of an electrochemical cell or battery utilizing a hydrophobic ionic liquid of the invention.

Use of Hydrophobic Ionic Liquids of the Invention in Electrochemical Cells or Batteries An electrochemical cell or battery of the invention includes as an electrolyte a hydrophobic ionic liquid of the invention. Referring to FIG. 3, such a cell 12 has, within a conductive container 14 and cover 15, an anode 16 and a cathode particle mix 18. A separator 20 which includes an electrolyte is placed between the anode and the mix. Container 14 is crimped at the edges 24 capturing cover 15 under an insulating gasket 22. Cells so formed may be configured for either parallel or series operation.

The electrolyte can include a polar cosolvent along with the hydrophobic ionic liquid, as described under Example VI, to enhance ionic conductivity. For lithium-ion batteries, the electrolyte will also include the dissolved salt LiX (where X=any anion of the invention).

EXAMPLE VIII

Figure 4:
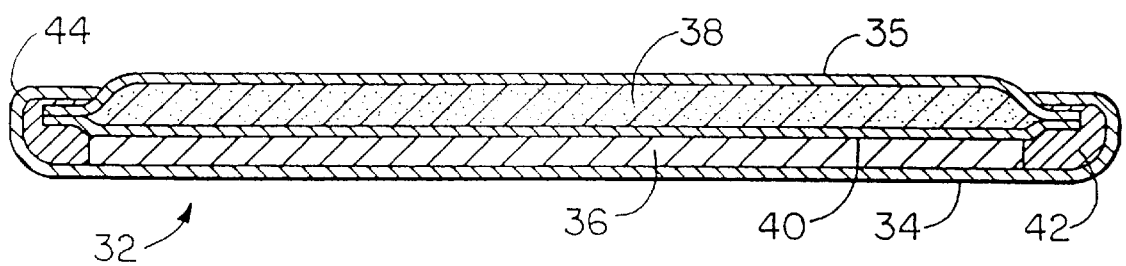
FIG. 4 shows an arrangement of components of a capacitor utilizing a hydrophobic ionic liquid of the invention.

Use of Hydrophobic Ionic Liquids of the Invention in Electrochemical Capacitors An electrochemical capacitor of the invention similarly includes a hydrophobic ionic liquid of the invention and is configured as shown in FIG. 4. An electrochemical capacitor is an electrochemical storage device in which electric charge is stored in the electrical double-layer formed at the interface between a polarizable electrode and an electrolyte solution when dc voltage is applied.

Referring to FIG. 4, such a cell 32 has, within a conductive container 34 and cover 35, two electrodes 36 and 38 which may be composed of the same material or different materials. A separator 40 which includes an electrolyte is placed between the two electrodes. Container 34 is crimped at the edges 44, capturing cover 35 under an insulating gasket 42. Cells so formed may be configured for either parallel or series operation.

Such a capacitor was tested for its ability to withstand long-term cycling in the following experiment:

Two 3-layer Spectracarb® 2220 carbon cloth electrodes were assembled in union Ts containing EMI Im electrolyte and placed on battery cycling equipment for long-term cycling at a low current density. The current was set to 3 Ma/cm$^2$ with Cell A cycling from 0.2V to 2.0V and Cell B cycling from 0.2V to 3.0V.

The data obtained are summarized in Table 4 and show that the capacitance for both cells continued to remain above 25 F/g, with a specific capacitance of 100 F/g per electrode. Although Cell B displays slightly higher capacitance values for the 0.2 to 3.0V range, it has lost 15% of its initial capacitance over the 600 cycles, while Cell A's capacitance values for the 0.2 to 2.0V range have remained constant through 1100 cycles.

TABLE 4

Long-term cycling of Tee-cell capacitors having SC 2220 carbon cloth electrodes in EMI Im electrolyte

| Cell[a] | Voltage Window (V) | Cycle # | Time (min) C[b] | D | Capacitance (F/g) C | D | D/C |
|---|---|---|---|---|---|---|---|
| A | 0.2–2.0 | 5 | 20.0 | 20.0 | 25.0 | 25.0 | 1.00 |
|  |  | 100 | 21.7 | 20.0 | 27.0 | 25.0 | 0.93 |
|  |  | 330 | 20.0 | 20.0 | 25.0 | 25.0 | 1.00 |
|  |  | 1100 | 20.0 | 19.3 | 25.0 | 24.1 | 0.96 |
| B | 0.2–3.0 | 10 | 39.0 | 37.7 | 31.3 | 30.0 | 0.97 |
|  |  | 140 | 36.0 | 35.0 | 28.9 | 28.1 | 0.97 |
|  |  | 605 | 33.3 | 33.3 | 26.7 | 26.3 | 0.98 |

[a]each cell uses three 1 cm$^2$ carbon cloth discs (13 mg per disc) as an electrode
Current = 3 Ma/cm$^2$, which is equivalent to 1 Ma/disk or 75 Ma/g
[b]C = charge and D = discharge Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

What is claimed is:

1. A hydrophobic ionic liquid comprising a cation and an anion, wherein said cation is selected from the group consisting of:

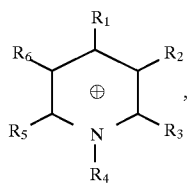

Pyridinium

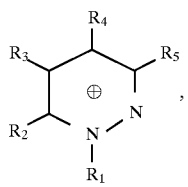

Pyridazinium

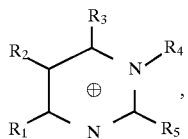

Pyrimidinium

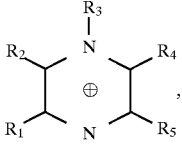

Pyrazinium

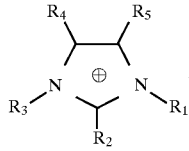

Imidazolium

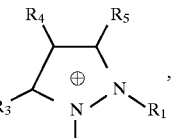

Pyrazolium

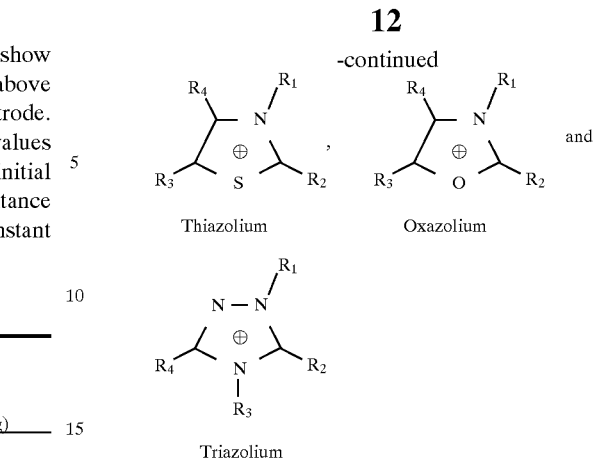

wherein $R_1$, $R_2$, $R_3$, $R_4$, $R_5$, and $R_6$ are either H; or F; or separate alkyl groups of from 1 to 4 carbon atoms, respectively; or two said separate alkyl groups are joined together to constitute a unitary alkylene radical of from 2 to 4 carbon atoms forming a ring structure converging on N; or separate phenyl groups; and wherein said alkyl groups, unitary alkylene radical or phenyl groups are optionally substituted with electron withdrawing groups; and wherein said anion is a non-Lewis acid-containing polyatomic anion having a van der Waals volume exceeding 100 Å$^3$.

2. The hydrophobic ionic liquid of claim 1 wherein, in said cation, said optional electron withdrawing groups are selected from the group consisting of F—, Cl—, CF$_3$—, SF$_5$—, CF$_3$S—, (CF$_3$)$_2$CHS— and (CF$_3$)$_3$CS—.

3. The hydrophobic ionic liquid of claim 1 wherein said cation has the formula

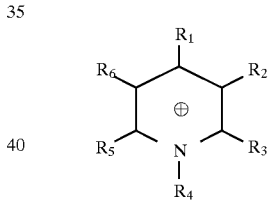

wherein $R_1$, $R_2$, $R_3$, $R_4$, $R_5$, and $R_6$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, unitary alkylene radical or phenyl groups are optionally substituted with electron withdrawing groups.

4. The hydrophobic ionic liquid of claim 1 wherein said cation has the formula

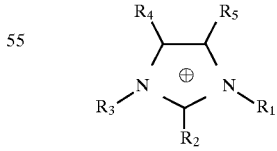

wherein $R_1$, $R_2$, $R_3$, $R_4$ and $R_5$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, unitary alkylene radical or phenyl groups are optionally substituted with electron withdrawing groups.

5. The hydrophobic ionic liquid of claim 1 wherein said cation has the formula

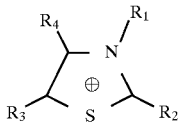

wherein $R_1$, $R_2$, $R_3$ and $R_4$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, unitary alkylene radical or phenyl groups are optionally substituted with electron withdrawing groups.

6. The hydrophobic ionic liquid of claim 1 wherein said cation has the formula

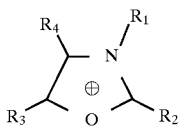

wherein $R_1$, $R_2$, $R_3$ and $R_4$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, unitary alkylene radical or phenyl groups are optionally substituted with electron withdrawing groups.

7. The hydrophobic ionic liquid of claim 1 wherein said anion has the formula

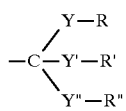

wherein each of the moieties Y, Y', and Y", are —SO$_2$— or —CO—; the groups R and R' are separate halogenated alkyl groups of 1–4 carbon atoms, respectively or are joined together to constitute a unitary halogenated alkylene radical of from 2–4 carbon atoms linking Y and Y' and forming a ring structure which includes R, R', Y, Y', and the carbon atom to which Y and Y' are attached; and the group R" is an alkyl or haloalkyl radical of 1–4 carbon atoms or a halogenated phenyl group.

8. The hydrophobic ionic liquid of claim 1 wherein said anion has the formula

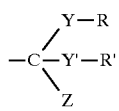

wherein each of the moieties Y and Y' are —SO$_2$— or —CO—; the groups R and R' are separate halogenated alkyl groups of 1–4 carbon atoms, respectively or are joined together to constitute a unitary halogenated alkylene radical of from 2–4 carbon atoms linking Y and Y' and forming a ring structure which includes R, R', Y, Y', and the carbon atom to which Y and Y' are attached; and Z is an electron-withdrawing substituent selected from the group consisting of —C(O)H, —NO$_2$, —CN, —F, and perfluorinated alkyls and aryls containing no more than 8 carbons.

9. The hydrophobic ionic liquid of claim 1 wherein said anion has the formula

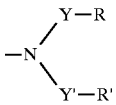

wherein each of the moieties Y and Y' are —SO$_2$— or —CO—; and the groups R and R' are separate halogenated alkyl groups of 1–4 carbon atoms.

10. The hydrophobic ionic liquid of claim 1 wherein said anion is perfluoro-1,1-dimethylpropyl alkoxide, having the formula $CF_3CF_2(CF_3)_2CO$—.

11. The hydrophobic ionic liquid of claim 1 wherein said anion is selected from the group consisting of $(CF_3)_2PF_4^-$, $(CF_3)_3PF_3^-$ $(CF_3)_4PF_2^-$, $(CF_3)_5PF^-$ $(CF_3)_6P^-$, $SF_5CF_2SO_3^-$, $SF_5CHFCF_2SO_3^-$, $(CF_3SO_2)_2CH^-$, $(SF_5)_3C^-$ and $(O(CF_3)_2C_2(CF_3)_2O)_2PO^-$.

12. The hydrophobic ionic liquid of claim 1 wherein said anion is a mono- or di-perfluorosulfonate.

13. An electrolyte for use in an electrochemical cell comprising
   the hydrophobic ionic liquid of claim 1; and
   a polar organic liquid.

14. The electrolyte of claim 13, wherein said polar organic liquid is selected from the group consisting of linear ethers, cyclic ethers, esters, carbonates, lactones, nitriles, amides, sulfones and sulfolanes.

15. The electrolyte of claim 13, wherein said polar organic liquid is selected from the group consisting of diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrrolidone, dimethylsulfone, tetramethylene sulfone, sulfolane and thiophene.

16. An electrochemical cell comprising
   an anode;
   a cathode; and
   an electrolyte comprising the hydrophobic ionic liquid of claim 1.

17. An electrochemical cell comprising
   an anode;
   a cathode; and
   an electrolyte comprising the hydrophobic ionic liquid of claim 1 and a lithium salt.

18. The electrochemical cell of claim 16 or claim 17, wherein said electrolyte further comprises a polar organic liquid.

19. The electrochemical cell of claim 18 wherein said electrolyte comprises a solution of 1-ethyl-3-methylimidazolium imide in the polar organic liquid.

20. A capacitor comprising
   a first electrode;
   a second electrode; and
   an electrolyte, said electrolyte comprising the hydrophobic ionic liquid of claim 1.

21. The capacitor of claim 20 wherein said electrolyte further comprises a polar organic liquid.

22. The capacitor of claim 21 wherein said polar organic liquid is selected from the group consisting of linear ethers, cyclic ethers, esters, carbonates, lactones, nitriles, amides, sulfones and sulfolanes.

23. The capacitor of claim 21 wherein said polar organic liquid is selected from the group consisting of diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrolidone, dimethylsulfone, tetramethylene sulfone, sulfolane and thiophene.

24. The capacitor of claim 21 wherein said electrolyte comprises a solution of 1-ethyl-3-methylimidazolium imide in the polar organic liquid.

25. A hydrophobic salt comprising a cation and an anion, wherein said cation is a perfluorinated, unsaturated, nitrogen-containing heterocycle and said anion is organic or inorganic.

* * * * *

UNITED STATES PATENT AND TRADEMARK OFFICE
CERTIFICATE OF CORRECTION

PATENT NO. : 5,827,602
DATED : October 27, 1998
INVENTOR(S) : Victor R. Koch, et al.

It is certified that error appears in the above-indentified patent and that said Letters Patent is hereby corrected as shown below:

Column 7, line 53, "(-10 v/o)" should read --(~10 v/o)--.

Signed and Sealed this

Ninth Day of November, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,827,602  
DATED : October 27, 1998  
INVENTOR(S) : Victor R. Koch et al.

Page 1 of 1

It is certified that error appears in the above-identified patent and that said Letters Patent is hereby corrected as shown below:

Column 1,
Line 10, please delete the following paragraph:
" GOVERNMENT RIGHTS
Part of the work leading to this invention was carried out with United States government support provided under Department of Defense contracts F33615-94-C-2469 and Department of Energy contract F602-96ER82149. Therefore the U.S. government has certain rights in this invention."

Signed and Sealed this

Eighth Day of January, 2002

*Attest:*

JAMES E. ROGAN
*Attesting Officer*  *Director of the United States Patent and Trademark Office*